3,407,183
ACRYLATE AND METHACRYLATE ESTERS AND POLYMERS THEREOF

Basil S. Farah, West Seneca, N.Y., and Everett E. Gilbert, Morris Township, Morris County, N.J., assignors to Allied Chemical Corporation, New York, N.Y., a corporation of New York
No Drawing. Filed Sept. 7, 1965, Ser. No. 485,606
9 Claims. (Cl. 260—79.3)

This invention relates to novel acrylate and methacrylate polymers useful for treating fabrics to render them oil repellent. The invention also includes the monomeric acrylate and methacrylate esters which form these polymers.

The novel monomer compounds of this invention are the acrylate esters and methacrylate esters of 1,3-bis (heptafluoroisopropyl)benzenesulfonyl-(N-alkyl,N-2 - hydroxyethyl)amides. These alcohols, which may be referred to as sulfonamido ethanol compounds, are represented by the formula:

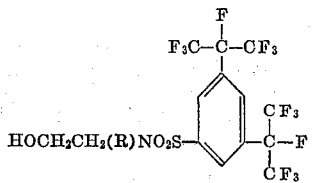

wherein R is an alkyl group containing 1 to 6 carbon atoms (methyl, ethyl, propyl, butyl, amyl or hexyl). The corresponding acrylate esters have the formula:

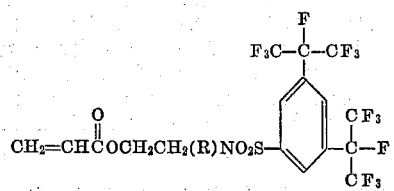

wherein R is as stated above. The corresponding methacrylate esters have the formula:

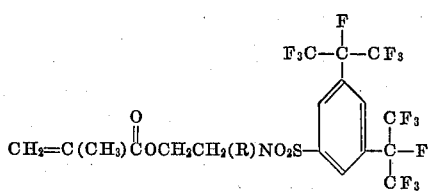

wherein R is as stated above.

The sulfonamido ethanol reactants which are esterified to produce the acrylate and methacrylate esters of this invention can be readily prepared by the reaction of a sodium or potassium salt of the corresponding 1,3-bis(heptafluoroisopropyl)benzenesulfonyl N-alkylamide with a halohydrin, preferably ethylene chlorohydrin. The reaction of the sodium salt of 1,3-bis(heptafluoroisopropyl) benzenesulfonyl N-butylamide with chlorohydrin, for example, may be represented as follows:

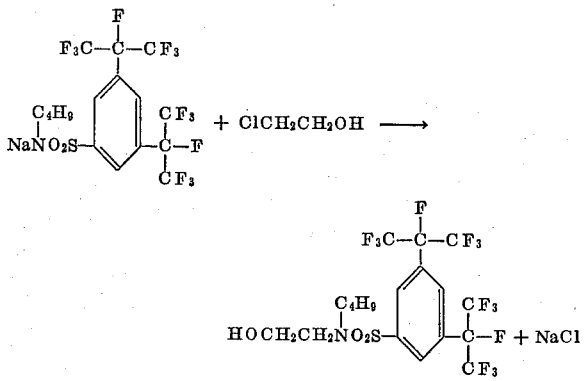

wherein R is an alkyl group containing 1 to 6 carbon atoms.

The sulfonyl N-alkylamide reactants can be readily prepared from the 1,3-bis(heptafluoroisopropyl)benzenesulfonyl chloride or fluoride described and claimed in copending application of Basil S. Farah, Everett E. Gilbert and Benjamin Veldhuis, Ser. No. 485,607, filed of even date herewith. As disclosed in that application, the sulfonyl chloride and fluoride are obtained by reacting 1,3-bis(heptafluoroisopropyl)benzene with chlorosulfonic acid and fluorosulfonic acid, respectively.

In preparation of the sulfonyl N-alkylamide reactants, the sulfonyl chloride or fluoride is reacted with an alkyl amine containing from 1 to 6 carbon atoms. The reaction of 1,3-bis(heptafluoroisopropyl)benzenesulfonyl chloride with n-butylamine, for example, may be represented as follows:

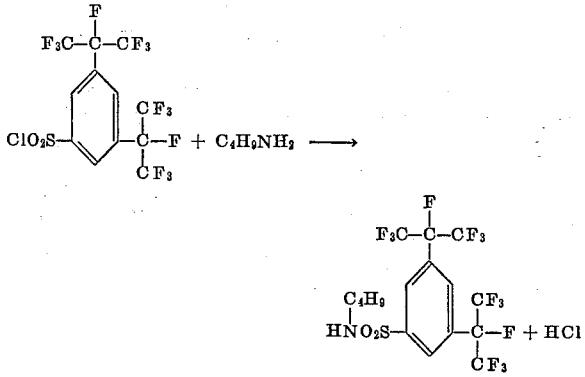

The sodium or potassium salt of the sulfonyl N-alkylamide can be readily produced by reacting the sulfonyl N-alkylamide with sodium or potassium dissolved in anhydrous methanol.

The acrylate and methacrylate esters of the present invention are prepared by reacting the sulfonamido ethanol with an acrylic compound of the formula:

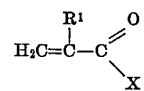

wherein X is a member selected from the group consisting of chlorine, hydroxyl and methoxy and $R^1$ is a member selected from the group consisting of hydrogen and methyl. It is to be understood, of course, that the acrylic reactant may also be employed in the form of its anhydride.

The mol ratio of the reactants is not critical, and from about 0.1 mol to about 10 mols of the sulfonamido ethanol compound per mol of the acrylic reactant may be employed to secure the desired reaction product. It is preferred, however, that a substantially stoichiometric mol ratio of about 1 to 1 be employed. If desired, a suitable organic solvent may be employed as diluent. Generally speaking, any organic solvent may be employed provided it is inert under the conditions of the reaction and is a solvent for the reactants. Typical solvents include benzene, xylene, chloroform and carbon tetrachloride. In order to minimize reaction time, an esterification catalyst such as copper flakes, or an adjuvant such as trifluoroacetic anhydride, pyridine, quinoline, triethylamine and N,N-dimethylaniline, may be employed. The reaction temperature may range from about room temperature up to the boiling point of the reaction mixture. In preferred operation, a temperature ranging from about 60° C. to 110° C. is utilized. Recovery and purification of the resulting acrylate or methacrylate ester may be effected by employing conventional procedures. For example, the reaction mixture may be simply treated with an aqueous alkaline solution, filtered and the filter cake washed with a suitable organic solvent such as benzene and finally distilled.

The reaction of 1,3-bis(heptafluoroisopropyl)-benzenesulfonyl-(N-butyl,N-2-hydroxyethyl)amide with acrylic acid, for example, may be represented by the following equation:

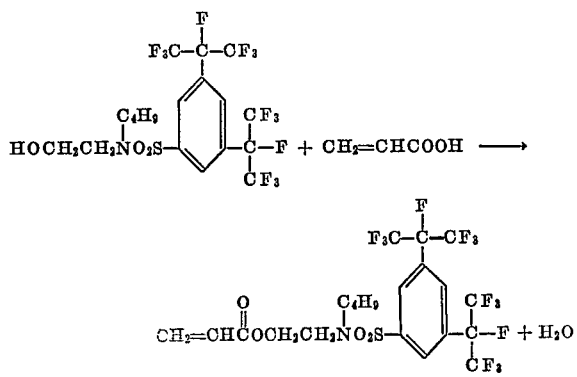

The acrylate and methacrylate esters may be polymerized by maintaining the ester at temperature in the range of about 20° C. to 100° C. using a polymerization catalyst, actinic radiation or a combination thereof. Suitable polymerization catalysts are illustrated by organic free radical generators such as potassium persulfate and benzoyl peroxide, or other peroxidic materials.

The following examples, in which parts are by weight, illustrate preparation of the acrylate and methacrylate esters and their homopolymers.

Example 1

50 parts of 1,3-bis(heptafluoroisopropyl)benzenesulfonyl fluoride were added dropwise over a period of 42 minutes to a mixture of 18 parts of n-butylamine and 72 parts of isopropyl ether in a reaction vessel with stirring and cooling to maintain the temperature at 25–30° C. The mixture was then heated at 40° C. for 18 hours and poured into a mixture of 10 parts of concentrated HCl and 40 parts of distilled water to remove unreacted amine. The resulting organic layer was separated and washed with an aqueous solution of 4 parts of ferrous sulfate and 14 parts of concentrated HCl in 82 parts of distilled water (to remove peroxides and any residual amine) and then with distilled water. The solvent was removed by distillation in vacuo leaving 50 parts of 1,3-bis(heptafluoroisopropyl)benzenesulfonyl N-butylamide. The infrared spectrum of this material showed N—H absorption at 2.8 microns and $CF_3$ absorptions between 7.5 and 8.5 microns.

A solution of 2.3 parts of sodium in 18 parts of anhydrous methanol was added to 50 parts of the sulfonyl N-butylamide dissolved in 36 parts of anhydrous methanol, and the mixture was stirred 16 hours. Upon evaporation of the methanol, 50.3 parts of the sodium salt of the sulfonyl N-butylamide were obtained.

The sodium salt was mixed with 12 parts of ethylene chlorohydrin and stirred for 1 hour. The temperature rose to 35° C., and the reaction mixture became a thin slurry. The reaction mixture was heated at 115° C. for 11 hours, cooled and taken up in diethyl ether. The diethyl ether layer was separated, washed with water and then evaporated to dryness leaving 40 parts of the alcohol, 1,3 - bis(heptafluoroisopropyl)benzenesulfonyl - (N-butyl,N-2-hydroxyethyl)amide. The infrared spectrum of the alcohol showed $CF_3$ absorptions between 7.5 and 8.5 microns.

40 parts of the alcohol, 26 parts of benzene, 0.15 part of copper flakes, 5.8 parts of acrylic acid and 0.3 part of concentrated sulfuric acid were heated with stirring in a reaction vessel equipped with a Dean-Stark trap for removing water. The mixture was refluxed until the water in the trap reached a constant level, which occurred after 4 hours. 3 parts of calcium hydroxide were added to the mixture to neutralize excess acids, and stirring was resumed for 15 minutes. The mixture was filtered and the filter cake was washed with benzene. Benzene was removed on a rotating evaporator at 50° C. and 25 mm. Hg. The residue, constituting 38.5 parts, was the acrylate ester of 1,3-bis(heptafluoroisopropyl)benzenesulfonyl-(N-butyl,N-2-hydroxyethyl)amide. The infrared spectrum of the acrylate ester showed C=O absorption at 5.75 microns, C=C absorption at 6.1 microns and $CF_3$ absorptions between 7.5 and 8.5 microns.

Example 2

14 parts of the acrylate ester of Example 1, 18 parts of oxygen-free water and 0.7 part of "FC–98" (a perfluorinated emulsifier) were placed in a polymerization vessel and flushed with nitrogen for 30 minutes while stirring. 7 parts of acetone were added, and stirring was continued for 10 minutes at 50° C., after which 0.07 part of potassium persulfate was added. The reaction mixture was then heated for 90 minutes at 50° C. under nitrogen to induce polymerization. The polymer was coagulated with methanol to a rubbery mass. Analysis of the polymer, a homopolymer of the acrylate ester, gave the following results:

Calculated: C, 38.9%; H, 2.9%; F, 41.3%; S, 4.9%; N, 2.2%. Found: C, 39.5%; H, 3.8%; F, 40.7%; 4.7%; N, 1.9%.

Example 3

A methacrylate ester is prepared by reacting 1,3-bis(heptafluoroisopropyl)benzenesulfonyl - (N - butyl-,N - 2-hydroxyethyl)amide with methacrylic acid, following the procedure described in Example 1. The methacrylate ester so obtained is then polymerized to form a homopolymer by the procedure described in Example 2.

The following tests illustrate the oil repellency of fabrics treated with a polymer of this invention.

The polymer of Example 2 was dissolved in varying amounts of (2-hydroxy-hexafluoro-2-propyl)benzene, and the solutions were used to treat swatches of cotton print fabrics. A 2 weight percent pickup of the polymer by the fabric gave an oil repellency value of 80, using the procedure described in Textile Research Journal, 32, 320 (1962). A 9 weight percent pickup of the polymer by the fabric gave a value of 90. These tests showed that the treated fabrics possessed good oil repellency properties.

Since various changes and modifications may be made

We claim:
1. Acrylate esters and methacrylate esters having the respective formulas:

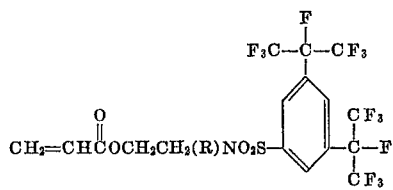

and

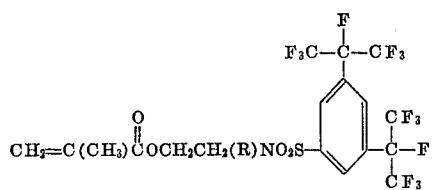

wherein R is an alkyl group containing 1 to 6 carbon atoms.

2. An acrylate ester having the formula:

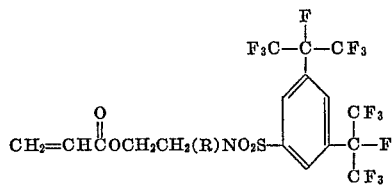

wherein R is an alkyl group containing 1 to 6 carbon atoms.

3. A methacrylate ester having the formula:

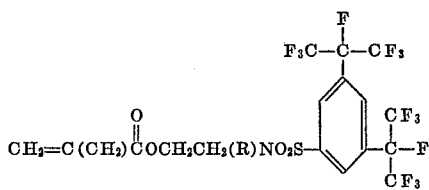

wherein R is an alkyl group containing 1 to 6 carbon atoms.

4. The acrylate ester having the formula:

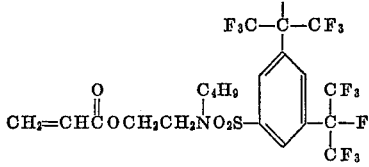

5. A solid homopolymer derived from an ester specified in claim 1 said ester being polymerized through its ethylenically unsaturated bond.

6. A solid homopolymer derived from an acrylate ester specified in claim 2 said ester being polymerized through its ethylenically unsaturated bond.

7. A solid homopolymer derived from a methacrylate ester specified in claim 3 said ester being polymerized through its ethylenically unsaturated bond.

8. A solid homopolymer of the acrylate ester specified in claim 4 said ester being polymerized through its ethylenically unsaturated bond.

9. Fabrics which have been impregnated with a homopolymer specified in claim 5 so as to have been rendered oil repellent.

References Cited

UNITED STATES PATENTS 2,803,615  8/1957  Ahlbrecht et al. _____ 260—486

JOSEPH L. SCHOFER, *Primary Examiner.*

D. K. DENENERG, *Assistant Examiner.*

U.S. DEPARTMENT OF COMMERCE
PATENT OFFICE

UNITED STATES PATENT OFFICE
CERTIFICATE OF CORRECTION

Patent No. 3,407,183                    October 22, 1968

Basil S. Farah et al.

It is certified that error appears in the above identified patent and that said Letters Patent are hereby corrected as shown below:

Column 2, lines 19 to 20, cancel "wherein R is an alkyl group containing 1 to 6 carbon atoms.". Column 4, line 54, before "4.7%" insert -- S, --. Column 6, lines 2 to 9, the left-hand portion of the formula should appear as shown below:

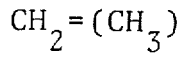

$$CH_2 = (CH_3)$$

Signed and sealed this 17th day of March 1970.

(SEAL)
Attest:

Edward M. Fletcher, Jr.                    WILLIAM E. SCHUYLER, JR.
Attesting Officer                            Commissioner of Patents